US008756694B2

(12) United States Patent
Plante et al.

(10) Patent No.: US 8,756,694 B2
(45) Date of Patent: Jun. 17, 2014

(54) PREVENTION OF EXPLOITATION OF UPDATE ROLLBACK

(75) Inventors: Stephane G. Plante, Kirkland, WA (US); Adam Gabriel Poulos, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1822 days.

(21) Appl. No.: 11/731,817

(22) Filed: Mar. 30, 2007

(65) Prior Publication Data

US 2008/0244556 A1 Oct. 2, 2008

(51) Int. Cl.
H04L 29/06 (2006.01)

(52) U.S. Cl.
USPC .......................................... 726/25

(58) Field of Classification Search
USPC ............................. 726/25; 717/170
See application file for complete search history.

(56) References Cited

U.S. PATENT DOCUMENTS

| | | | |
|---|---|---|---|
| 6,990,660 B2 | 1/2006 | Moshir et al. | 717/171 |
| 7,134,144 B2* | 11/2006 | McKune | 726/26 |
| 7,216,343 B2* | 5/2007 | Das et al. | 717/168 |
| 7,363,650 B2* | 4/2008 | Moriconi et al. | 726/1 |
| 7,474,639 B2* | 1/2009 | Rodbarry et al. | 370/328 |
| 7,542,963 B2* | 6/2009 | Primm | 1/1 |
| 7,543,334 B2* | 6/2009 | Vignoles et al. | 726/24 |
| 7,565,382 B1* | 7/2009 | Sobel | 1/1 |
| 2002/0019814 A1* | 2/2002 | Ganesan | 705/59 |
| 2002/0169974 A1* | 11/2002 | McKune | 713/200 |
| 2003/0041125 A1* | 2/2003 | Salomon | 709/220 |
| 2003/0041259 A1* | 2/2003 | Vignoles et al. | 713/200 |
| 2003/0115469 A1* | 6/2003 | Shippy et al. | 713/178 |
| 2003/0221189 A1* | 11/2003 | Birum et al. | 717/170 |
| 2004/0060044 A1* | 3/2004 | Das et al. | 717/171 |
| 2004/0199516 A1* | 10/2004 | Thames et al. | 707/100 |
| 2004/0215772 A1* | 10/2004 | Dinker et al. | 709/225 |
| 2004/0226008 A1* | 11/2004 | Jacobi et al. | 717/168 |
| 2004/0236718 A1* | 11/2004 | Primm | 707/1 |
| 2004/0260674 A1* | 12/2004 | Primm | 707/1 |

(Continued)

FOREIGN PATENT DOCUMENTS

| | | | |
|---|---|---|---|
| GB | 2 425 193 | 10/2006 | |
| GB | 2430774 A | * 4/2007 | G06F 21/22 |

OTHER PUBLICATIONS

Chen, H. et al., "Live Updating Operating Systems Using Virtualization", *VEE*, 2006, http://www.delivery.acm.org, 35-44.

(Continued)

*Primary Examiner* — Michael S McNally
(74) *Attorney, Agent, or Firm* — Bryan Webster; Andrew Sanders; Micky Minhas

(57) ABSTRACT

The exploitation of rolling back a system configuration to a previous system configuration is prevented by querying the update status of the system and comparing the received response with an expected response. If the comparison indicates that the update version of the system is older than the expected update version, the system is determined to have been rolled back. Accordingly, appropriate action is taken, such as sending a warning to the system, stopping the system from operating, disabling selected features, disconnecting the system from a network, banning the system from future connections to the network, and/or installing an update. The query can include a request for update version numbers of updates, times when updates were applied, predetermined questions, and an indication of the system (e.g., machine serial number, unique ID value).

18 Claims, 6 Drawing Sheets

(56) References Cited

U.S. PATENT DOCUMENTS

| | | | |
|---|---|---|---|
| 2005/0044401 A1* | 2/2005 | Morrow et al. | 713/200 |
| 2005/0086534 A1 | 4/2005 | Hindawi et al. | 713/201 |
| 2005/0132351 A1* | 6/2005 | Randall et al. | 717/168 |
| 2005/0152552 A1 | 7/2005 | Multerer et al. | 380/259 |
| 2005/0154629 A1* | 7/2005 | Matsuda et al. | 705/10 |
| 2005/0246767 A1* | 11/2005 | Fazal et al. | 726/11 |
| 2005/0260996 A1* | 11/2005 | Groenendaal | 455/445 |
| 2006/0026304 A1* | 2/2006 | Price | 710/8 |
| 2006/0236083 A1* | 10/2006 | Fritsch et al. | 713/1 |
| 2006/0259775 A2 | 11/2006 | Oliphant | 713/182 |
| 2007/0027506 A1* | 2/2007 | Stender et al. | 607/60 |
| 2008/0189693 A1* | 8/2008 | Pathak | 717/168 |

OTHER PUBLICATIONS

Lough, D.L. "A Taxonomy of Computer Attacks with Applications to Wireless Networks", Apr. 2001, http://scholar.lib.vt.edu/theses, 348 pages.

Dadzie, J., "Understanding Software Patching", *Queue*, Mar. 2005, http://delivery.acm.org, 24-30.

* cited by examiner

PREVENTION OF EXPLOITATION OF UPDATE ROLLBACK

TECHNICAL FIELD

The technical field relates generally to computer processing and more specifically to preventing the rolling back of a system configuration to a previous system configuration.

BACKGROUND

It is not uncommon for computing systems to be updated after installation. For example, a personal computer (PC) or game console (e.g., XBOX®) may contain software bugs and/or security issues needing resolution after purchase. To resolve these issues, software patches are typically provided to update systems. Hackers have been known to exploit software bugs and security flaws. A common practice among hackers it to roll back a system to a time prior to an update. For example, if a game system contains a software bug that allows game players to cheat, a patch can be issued that fixes the software bug. A hacker wanting to exploit the software bug can roll back the game system configuration to a time prior to the update, thus defeating the patch and allowing the hacker to cheat.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

A mechanism is provided that prevents the use of a system that has been rolled back. Rolling back comprises rolling back a system configuration to a previous system configuration. Prevention of the use of a rolled back system is accomplished by querying the update status of a system and comparing the response thereto with an expected response. If the received response matches the expected response, the system is determined not to have been rolled back. If the received response does not match the expected response, and it is determined that the update version of the system is older than the expected update version, the system is considered to have been rolled back. If the system is determined to have been rolled back, appropriate action is taken, such as sending a warning to the system, stopping the system from operating, disabling selected features, disconnecting the system from a network, banning the system from future connections to the network, installing an update, or the like. The update status being queried can include version numbers of updates, time updates were made, responses to challenges, an indication of the system (e.g., machine serial number, unique ID value), or a combination thereof, for example.

BRIEF DESCRIPTION OF THE DRAWINGS

The foregoing summary, as well as the following detailed description, is better understood when read in conjunction with the appended drawings. For the purpose of illustrating update rollback exploitation prevention, there is shown in the drawings exemplary constructions thereof, however, update rollback exploitation prevention is not limited to the specific methods and instrumentalities disclosed.

DETAILED DESCRIPTION OF ILLUSTRATIVE EMBODIMENTS

Figure 1:
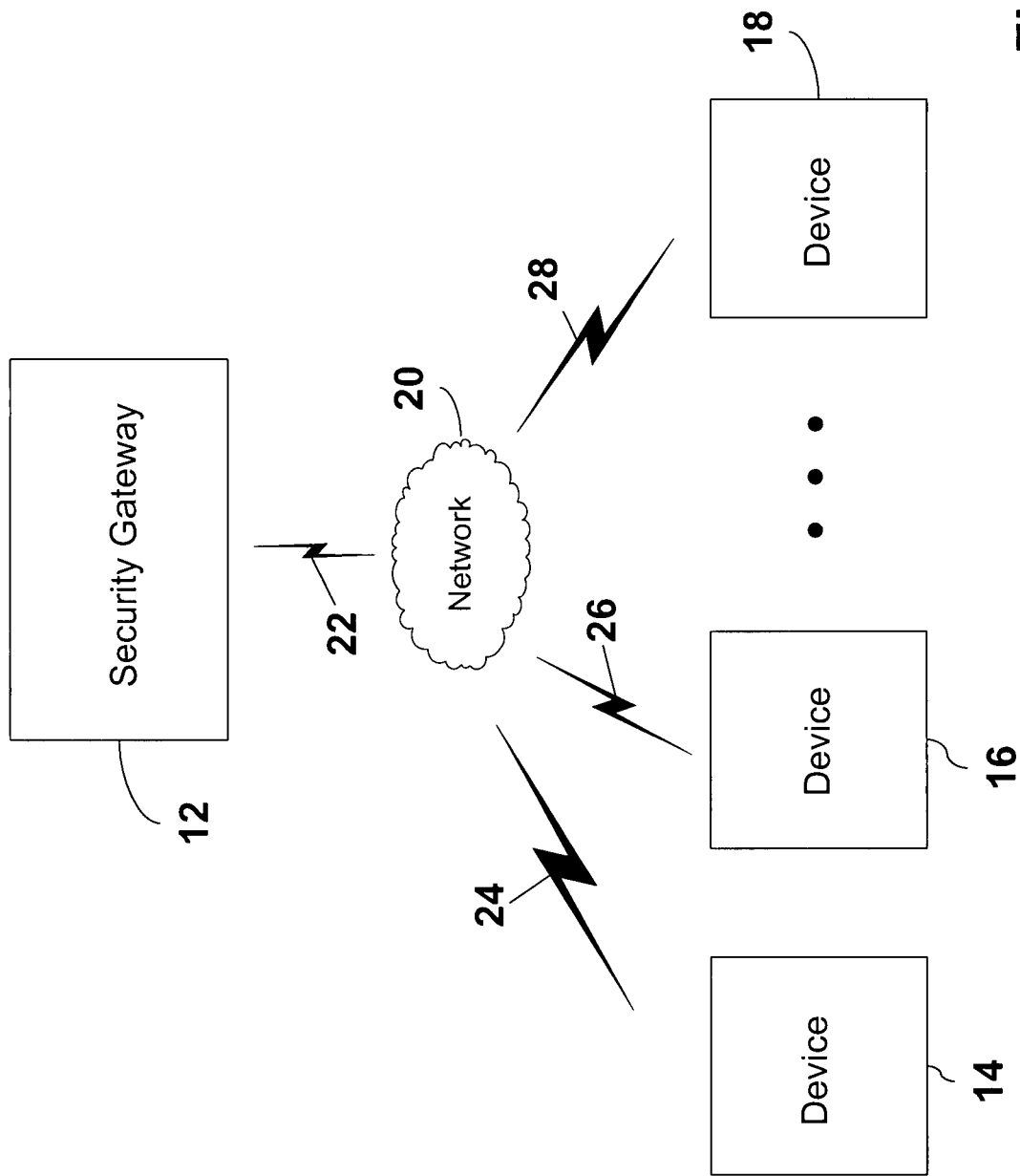
FIG. 1 is an example system diagram illustrating update rollback exploitation prevention.

Rolling back a system configuration to a time prior to an update is prevented by querying the system for update status. If the query response does not match an expected response, and it is determined that the update version of the system is older than the expected update version, the system is determined to have been rolled back. FIG. 1 is an illustration of an update rollback exploitation prevention system. The security gateway 12 provides queries to devices 14, 16, 18, via a network 20. The security gateway 12 can comprise any appropriate processor or combination of processors configured to provide status queries to the devices 14, 16, 18. The security gateway 12 can be part of a service, such as an online game service, for example. The network 20 can comprise any appropriate network, such as a local area network (LAN), a wide area network, the internet, a home network, and enterprise network, or a combination thereof, for example. The devices 14, 16, and 18, represent any number of processors, including a single processor. Each device 14, 16, and 18, can comprise any appropriate processor capable of receiving update queries, such as a general purpose processor, a laptop, a PC, a desktop, a server, a set-top box, a portable phone, a portable entertainment device, a personal digital assistant (PDA), a dedicated game console (e.g., XBOX®, XBOX® 360), or the like. The security gateway 12 and the devices 14, 16, and 18, are coupled to the network 20, via interfaces 22, 24, 26, and 28, respectively. The interfaces 22, 24, 26, and 28, are representative of any appropriate interface, such as a wireless interface, a wired interface, or a combination thereof.

To prevent the exploitation of update rollback, the security gateway 12 provides an update status query to a device (e.g., device 14, 16, or 18). In an example embodiment, the update status query contains a request for the version number of the most recent update applied to the device and an indication (e.g., machine serial number, unique If) value) of the respective device, or a combination thereof, for example. In another example embodiment, the security gateway 12 queries the device for the version numbers of all updates applied to the device. In yet another example embodiment, the update status query includes at least one challenge (e.g. question) to the device. In response to the update status query, the device responds with a version number, or version numbers, as requested. The device also responds with an indication of the device, such as a serial number, or any appropriate indication of the device. For example, if the device is a game console, the game console can respond with a unique ID value indicative of the game console. If requested by the security gateway 12, the queried device responds with the time each update was applied to the device. Further, the queried device provides a response (e.g., answer) to each challenge (e.g., question) provided by the security gateway 12 in the update status query.

In an example embodiment, the security gateway 12 provides updates to a device or devices 14, 16, 18. In various embodiments, the update includes a version number of the update, the time the update was provided to a device, and/or challenges and respective responses. At least a portion of the information provided to a device with the update is stored in the security gateway 12. For example, the version number of the update and the time the update was provided to a device, and the challenges and respective responses are stored in the security gateway 12. Information can be stored on any appropriate means in the security gateway 12, such as optical memory, semiconductor memory, magnetic memory, capacitive memory, charged couple device memory, or a combination thereof, for example. Information can be stored internal to the security gateway 12, external to the security gateway 12 (e.g., external database), or a combination thereof.

The security gateway 12 has a notion of time that it associates with the information that the device 14, 16, 18 provides to the security gateway 12. For example, the security gateway 12 knows that at time X, the device 12, 14, 16 sent back information that contained time Y therein. The security gateway 12 can give different levels of trust to the time Y (because it is easy to tamper with), but the security gateway 12 knows that the time X is not tamperable. Thus, in an example embodiment the security gateway 12 records that at time X, information was received from the device 12, 14, 16, that may or may not comprise the time Y.

Responsive to receipt of the update information provided by the security gateway 12, the device 14, 16, 18, stores at least a portion of the information therein. For example, the device 14, 16, 18, stores therein, the received version number of the update, the time the update was provided, and/or the received challenge/response pair(s). The time the update was provided is with respect to the time assigned thereto by the security gateway 12. This is, in part, due to the fact that the time assigned by the security gateway 12 is less susceptible to compromise than time provided by the device 14, 16, 18. Thus, when the device is queried for update status, the device can obtain information for a response from the update information stored therein. Information can be stored on any appropriate means in the device 14, 16, 18, such as optical memory, semiconductor memory, magnetic memory, capacitive memory, charged couple device memory, or a combination thereof, for example. Information can be stored internal to the device 14, 16, 18, external to the device 14, 16, 18 (e.g., external database), or a combination thereof.

The security gateway 12 queries the device 14, 16, 18, for update status. The device 14, 16, 18, can be queried at any appropriate time, such as randomly, periodically, at the start of a game session, at the occurrence of predetermined events, or a combination thereof. The update status query can contain a request for the most recent update version number, a request for an identification of the device, a request for all update version numbers, a request for the time of each update, or a combination thereof. In an example embodiment, the update status query comprises at least one challenge (e.g., question). In response to the query, the device 14, 16, 18, provides the requested update version number(s), identification thereof, the requested update time(s), and an answer(s) to the challenge(s).

Upon receiving a response from the device 14, 16, 18, the security gateway 12 compares the information contained in the response to information stored in the security gateway 12. For example, the security gateway 12 compares: the received update version numbers with the update version numbers stored therein, the received device identifier with a device identifier stored therein, the received update times with the update times stored therein, the answers to the challenges with answers to the challenges stored therein. As another example, a comparison can occur in which the security gateway knows that at Time X, information set A was returned by the device, and that at time Y (Y>X) information set B was returned by the device. If information set B indicates a "previous version" (determined by any appropriate means) when compared to information set A, then rollback has occurred. This is advantageous in a scenario in which data is stored and post processed. For example, multiple instances of the secure gateway 12 can be running, wherein one of the multiple instances is randomly connected to a device. Storing the secure gateway's 12 relative time that the information about a device was received allows the post processing components to sort all events in chronological order (or make simple time checks) to determine the order in which information set A and information set B was received.

If the comparisons match, the device 14, 16, 18, is determined not to have been rolled back. If the comparisons do not match, and it is determined that the update version of the device 14, 16, 18, is older than the expected update version, the device 14, 16, 18, is determined to have been rolled back.

In an example scenario, a hacker or the like, could attempt to forge update versions on the device 12, 14, 16 by returning a fictitious, large update version to the security gateway 12, to prevent the need for modification to require servicing every time a new update version is released. In an example embodiment, to prevent such activity, the security gateway 12 validates that not only is the device-specified version correct relative to what has been installed previously, but also that the version is a known legitimate release (e.g., hacker modifies its device to claim it is running version #9999 when only 5 versions have been released).

If the device 14, 16, 18, is determined to have been rolled back, appropriate action is taken, such as sending a warning to the device 14, 16, 18, stopping (e.g., disabling execution) the device 14, 16, 18, from operating, disabling selected features of the device 14, 16, 18, disconnecting the device 14, 16, 18, from the network 20, banning the device 14, 16, 18, from future connections to the network 20, installing an update on device 14, 16, 18, or a combination thereof, for example.

The device 14, 16, 18, can be updated in any appropriate manner. For example, the device 14, 16, 18, can be updated by the security gateway 12 as described above, the device 14, 16, 18, can be updated via a disc or the like, or a combination thereof. For example, a device comprising a game console could be updated via an optical disc and subsequently be updated via the security gateway of an online game service. If the device 14, 16, 18, is updated via a disc, the next time the security gateway 12 queries the device 14, 16, 18, the security gateway 12 will determine that the update version number received is greater than (indicative of a newer update) than the expected update version number. In this case, the security gateway 12 determines that the device 14, 16, 18, has not been rolled back because the indicated updated version is newer than the expected update version. Accordingly, the security gateway 12 stores therein, the information pertaining to the newer update (e.g., the greater update version value).

Updates can be loaded onto the system via disks, through the security gateway itself, or through other mechanisms (e.g., memory unit, hard drives). No matter what the method of installation of the update, when a device communicates with the security gateway, the device will report the update version information, which the security gateway will track and ensure that it is always newer or the same as the previous version.

Figure 2:
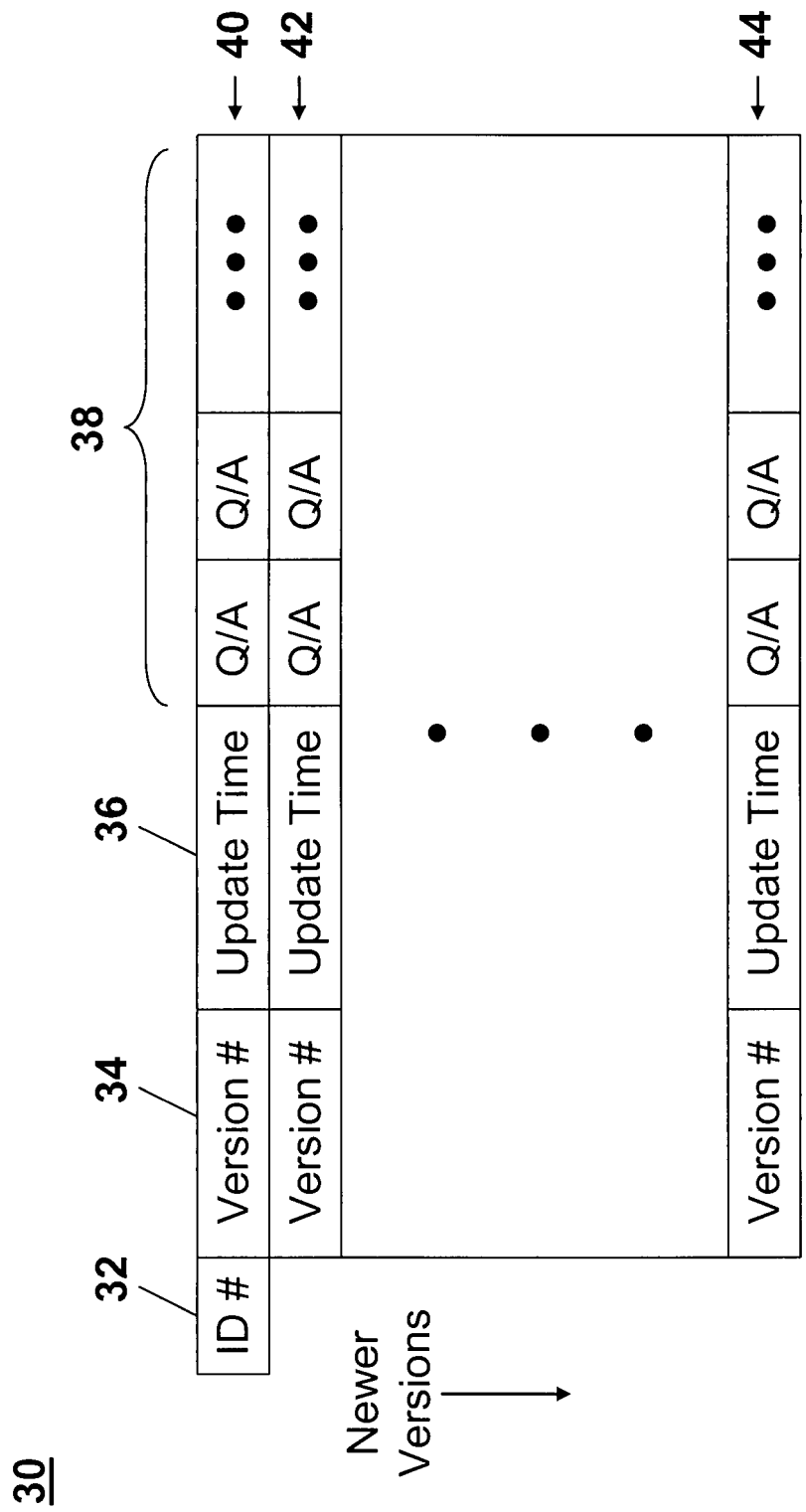
FIG. 2 is a depiction of an example challenge table.

FIG. 2 is a depiction of an example challenge table 30. In an example embodiment, the security gateway 12 stores therein a challenge table 30 containing the information to be compared when the device 14, 16, 18, is challenged by the security gateway 12. The challenge table 30 comprises the device indication 32 of a specific machine, in the form of a serial number, ID number, or the like. For each device indication 32, the challenge table 30 comprises a history of update information. As depicted in the challenge table 30, the history of update information comprises an update version number 34, an update time 36, and any number of question and answer pairs 38, for each update 40, 42, 44. As a new update is provided to the challenge table, the challenge table is updated to include new update information. In an example embodiment, the device 14, 16, 18, stores therein the challenge table 30 or a portion thereof. For example, the update table 30 stored in the device being updated can contain the most current update information, and not contain a complete history of update information.

It is emphasized that the depiction of challenge table 30 is an example. For example, client-specific information (e.g., information pertaining to a device 12, 14, 16) and server-specific information (e.g., information pertaining to the security gateway 12) could be separated. The client information contains at least the update itself and the update version. The Update Time portion 36 can be optional. Note that the client does not need to know the ID number that the security gateway assigned thereto. The information the security gateway tracks about a particular client is the ID # of that client, the update version information, and the security gateway-relative time associated with the update version. The security gateway does not necessarily track the update itself.

Update information for a specific update does not necessarily comprise question and answer pairs 38. For example, if a device is updated via a disc, the update information may not contain any question and answer pairs. Thus, when the device is queried and the device responds with the ID, the update version number, and the update time. The security gateway will update the challenge table with the update version only without question and answer pairs. In an example embodiment, the security gateway 12 provides to the device 14, 16, 18, additional question and answer pairs. The additional question and answer pairs can be provided at any appropriate time, such as with an update status query, with an update, randomly, periodically, at the occurrence of a predetermined event, or a combination thereof, for example. Thus, the device 14, 16, 18, can be queried for one or more of the additional answers.

Figure 3:
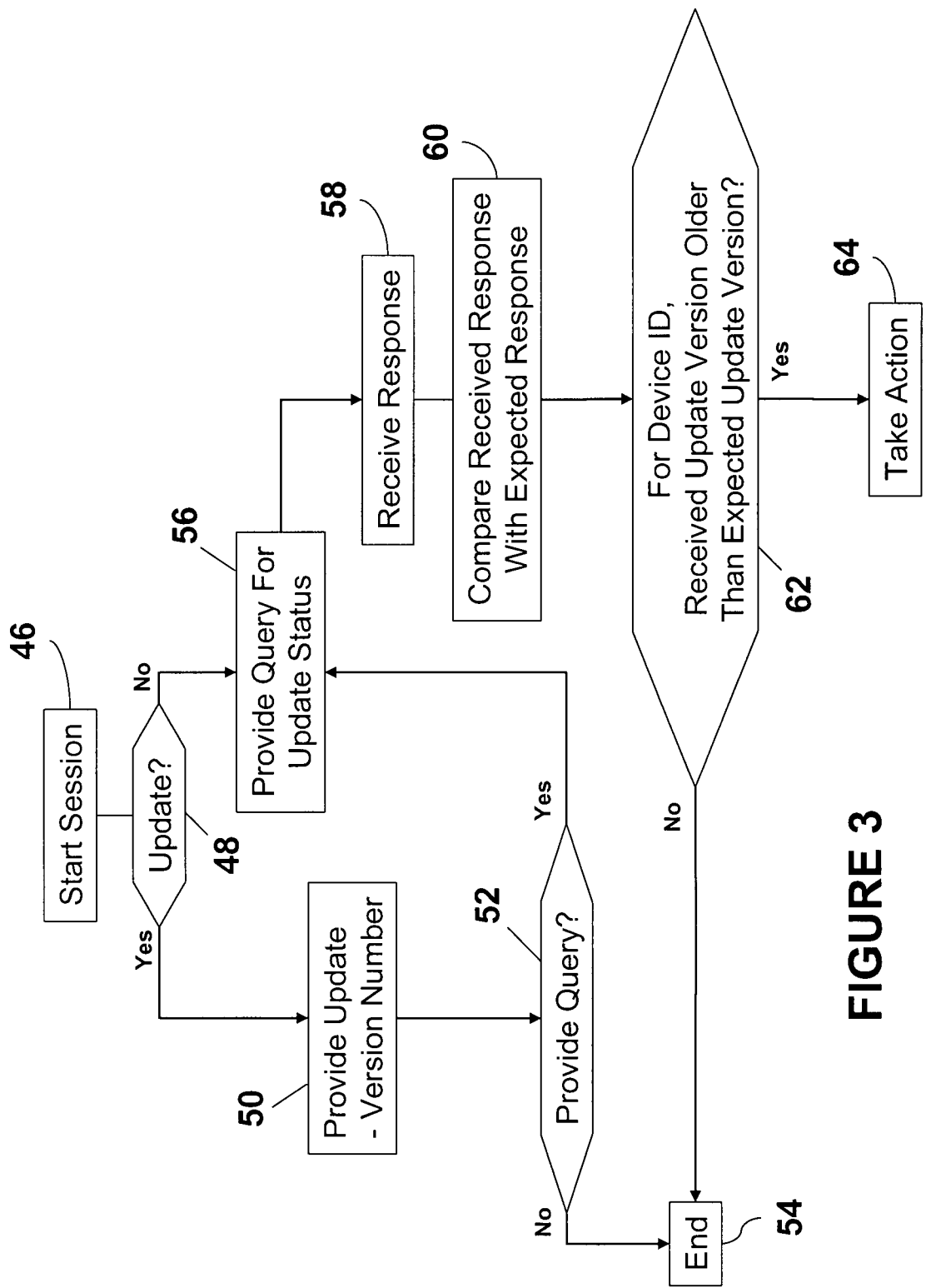
FIG. 3 is a flow diagram of an example process for preventing exploitation of update rollback.

FIG. 3 is a flow chart of an example process for preventing exploitation of update rollback. A session is started at step 46. Step 46 represents any appropriate starting point for the process depicted in FIG. 3. For example, step 46 can represent the start of an online game session, such as XBOX LIVE®. At step 48, it is determined if an update is to be provided. For example, the security gateway 12 could determine if a device, such as device 14, 16, 18, is to be updated with a newer software version, at step 48. If it is determined that an update is to be provided (at step 48), an update is provided at step 50. In an example embodiment, as described above, the update contains the update itself and a version number indicative of the version of the update. In response to receiving the update, the device receiving the update updates its challenge table. At step 52, it is determined if a query is to be provided. If no query is to be provided (step 52), the process ends as step 54. If a query is to be provided (step 52), an update status query is provided at step 56.

If, at step 48, it is determined that no update is to be provided, an update status query is provided at step 56. As described above, the update status query can comprise a request for a device identifier (ID), a version of an update, a time of an update, an answer to a question, or a combination thereof. In an example embodiment, the device identifier (ID) is established early in the process such as at step 46 when the session is started. In an example embodiment, as describe above, the update status query can also comprise an additional question and answer pair, or additional question and answer pairs to be stored in the device receiving the update status query. A response from the device is received at step 58. As described above, the information in the response is compared with expected information at step 60. At step 62, for a respective device, as indicated by the received device identifier (ID) or the like, it is determined if the response indicates that the received update version is older than the expected update version. Note that steps 60 and 62 can occur at any appropriate time. If the received update version is older than the expected update version, it is determined that the device has been rolled back. Appropriate action is taken at step 64. As described above, appropriate action can include sending a warning to the device, stopping the device from operating, disabling selected features of the device, disconnecting the device from the network, banning the device from future connections to the network, installing an update on device, or a combination thereof, for example.

If the received update version is not older than the expected update version (e.g., the received update version value is equal to or greater than the expected update version value, and the received update version is a legitimate update version), it is determined that the device has not been rolled back. The process ends at step 54. In an example embodiment, a query can be provided at any appropriate time after a session is started (step 46), such as randomly, periodically, or upon the occurrence of specific events, for example. In the embodiment, the process continues to step 52 and proceeds as previously described.

In an example embodiment, wherein the device comprises a game console and the security gateway is part of a game service, each time that a particular device (e.g., game console) connects to the game service, e.g., WINDOWS® LIVE, the game service checks the update state of the device. The update state can be stored by the game service in a database that tracks the device identification (e.g., serial number) along with the current update status (e.g., by update version number). If a newer update is available the game service uploads the update to the device and updates the database to reflect the latest state.

Figure 4:
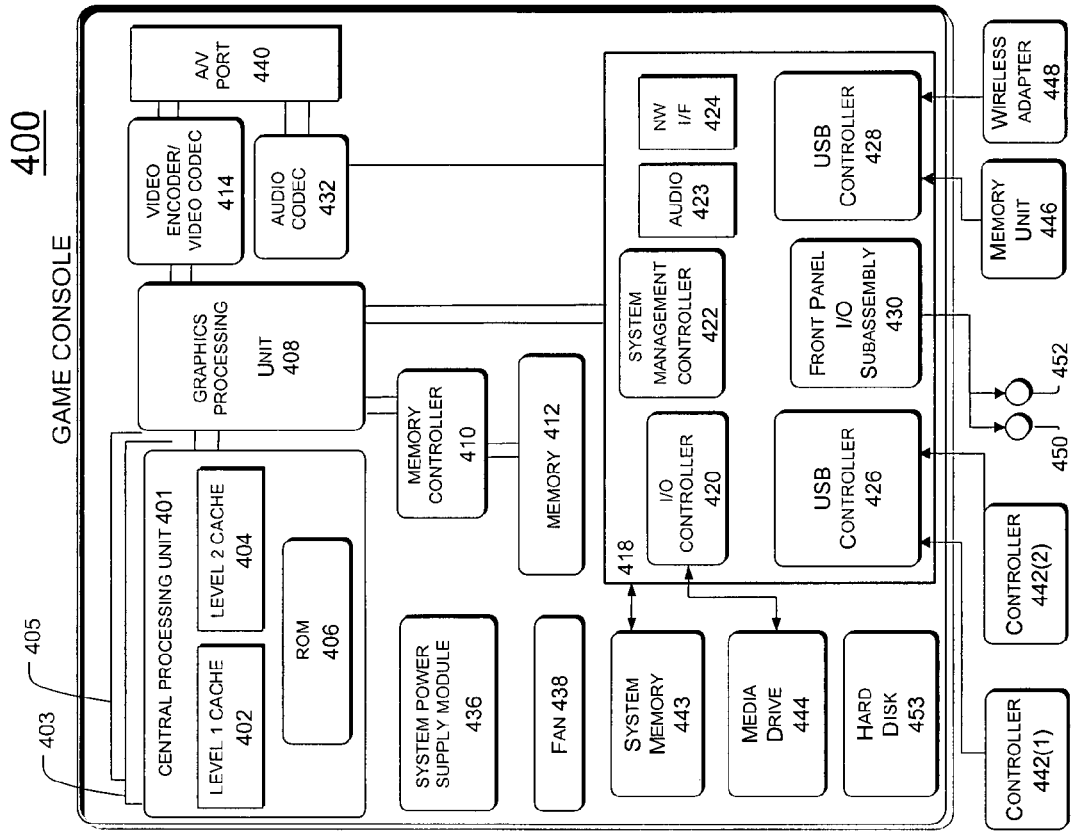
FIG. 4 is a block diagram of an example game console in which prevention of exploitation of update rollback can be accomplished.

The device (e.g., devices 14, 16, 18, in FIG. 1) can comprise a PC, a general purpose processor, a mobile device, a PDA, a dedicated game console or a combination thereof. FIG. 4 is a block diagram of an example game console 400 in which update rollback exploitation prevention can be accomplished. The game console 400 along with other devices described herein, such as a display device, are capable of performing the functions needed to accomplish update rollback exploitation prevention, as describe above. Game console 400 is an example of a dedicated host system, although, as noted above, a game console is only one example of a dedicated host device. A typical game console comprises hardware and software that are specifically designed to support a core set of usage scenarios.

Game console 400 has a central processing unit (CPU) 401 having a level 1 (L1) cache 402, a level 2 (L2) cache 404, and a flash ROM (Read-only Memory) 406. The level 1 cache 402 and level 2 cache 404 temporarily store data and hence reduce the number of memory access cycles, thereby improving processing speed and throughput. The flash ROM 406 can store executable code that is loaded during an initial phase of a boot process when the game console 400 is initially powered. Alternatively, the executable code that is loaded during the initial boot phase can be stored in a FLASH memory device (not shown). Further, ROM 406 can be located separate from CPU 401. Game console 400 can, optionally, be a multi-processor system; for example game console 400 can have three processors 401, 403, and 405, where processors 403 and 405 have similar or identical components to processor 401.

A graphics processing unit (GPU) 408 and a video encoder/video codec (coder/decoder) 414 form a video processing pipeline for high speed and high resolution graphics processing. Data is carried from the graphics processing unit 408 to the video encoder/video codec 414 via a bus. The video processing pipeline outputs data to an A/V (audio/video) port 440 for transmission to a television or other display device. A memory controller 410 is connected to the GPU 408 and CPU 401 to facilitate processor access to various types of memory 412, such as, but not limited to, a RAM (Random Access Memory).

Game console 400 includes an I/O controller 420, a system management controller 422, an audio processing unit 423, a network interface controller 424, a first USB host controller 426, a second USB controller 428 and a front panel I/O subassembly 430 that may be implemented on a module 418. The USB controllers 426 and 428 serve as hosts for peripheral controllers 442(1)-842(2), a wireless adapter 448, and an external memory unit 446 (e.g., flash memory, external CD/DVD ROM drive, removable media, etc.). The network interface 424 and/or wireless adapter 448 provide access to a network (e.g., the Internet, home network, etc.) and may be any of a wide variety of various wired or wireless interface components including an Ethernet card, a modem, a Bluetooth module, a cable modem, and the like.

System memory 443 is provided to store application data that is loaded during the boot process. A media drive 444 is provided and may comprise a DVD/CD drive, hard drive, or other removable media drive, etc. The media drive 444 may be internal or external to the game console 400. When media drive 444 is a drive or reader for removable media (such as removable optical disks, or flash cartridges), then media drive 444 is an example of an interface onto which (or into which) media are mountable for reading. Application data may be accessed via the media drive 444 for execution, playback, etc. by game console 400. Media drive 444 is connected to the I/O controller 420 via a bus, such as a Serial ATA bus or other high speed connection (e.g., IEEE 4394). While media drive 444 may generally refer to various storage embodiments (e.g., hard disk, removable optical disk drive, etc.), game console 400 may specifically include a hard disk 452, which can be used to store game data, application data, or other types of data, and on which the file systems depicted in FIGS. 4 and 4 may be implemented.

The system management controller 422 provides a variety of service functions related to assuring availability of the game console 400. The audio processing unit 423 and an audio codec 432 form a corresponding audio processing pipeline with high fidelity, 4D, surround, and stereo audio processing according to aspects of the present subject matter described herein. Audio data is carried between the audio processing unit 423 and the audio codec 426 via a communication link. The audio processing pipeline outputs data to the A/V port 440 for reproduction by an external audio player or device having audio capabilities.

The front panel I/O subassembly 430 supports the functionality of the power button 450 and the eject button 452, as well as any LEDs (light emitting diodes) or other indicators exposed on the outer surface of the game console 400. A system power supply module 436 provides power to the components of the game console 400. A fan 438 cools the circuitry within the game console 400.

The CPU 401, GPU 408, memory controller 410, and various other components within the game console 400 are interconnected via one or more buses, including serial and parallel buses, a memory bus, a peripheral bus, and a processor or local bus using any of a variety of bus architectures.

When the game console 400 is powered on or rebooted, application data can be loaded from the system memory 443 into memory 412 and/or caches 402, 404 and executed on the CPU 401. The application can present a graphical user interface that provides a consistent user experience when navigating to different media types available on the game console 400. In operation, applications and/or other media contained within the media drive 444 may be launched or played from the media drive 444 to provide additional functionalities to the game console 400.

The game console 400 may be operated as a standalone system by simply connecting the system to a television or other display. In this standalone mode, the game console 400 may allow one or more users to interact with the system, watch movies, listen to music, and the like. However, with the integration of broadband connectivity made available through the network interface 424 or the wireless adapter 448, the game console 400 may further be operated as a participant in a larger network community.

Figure 5:
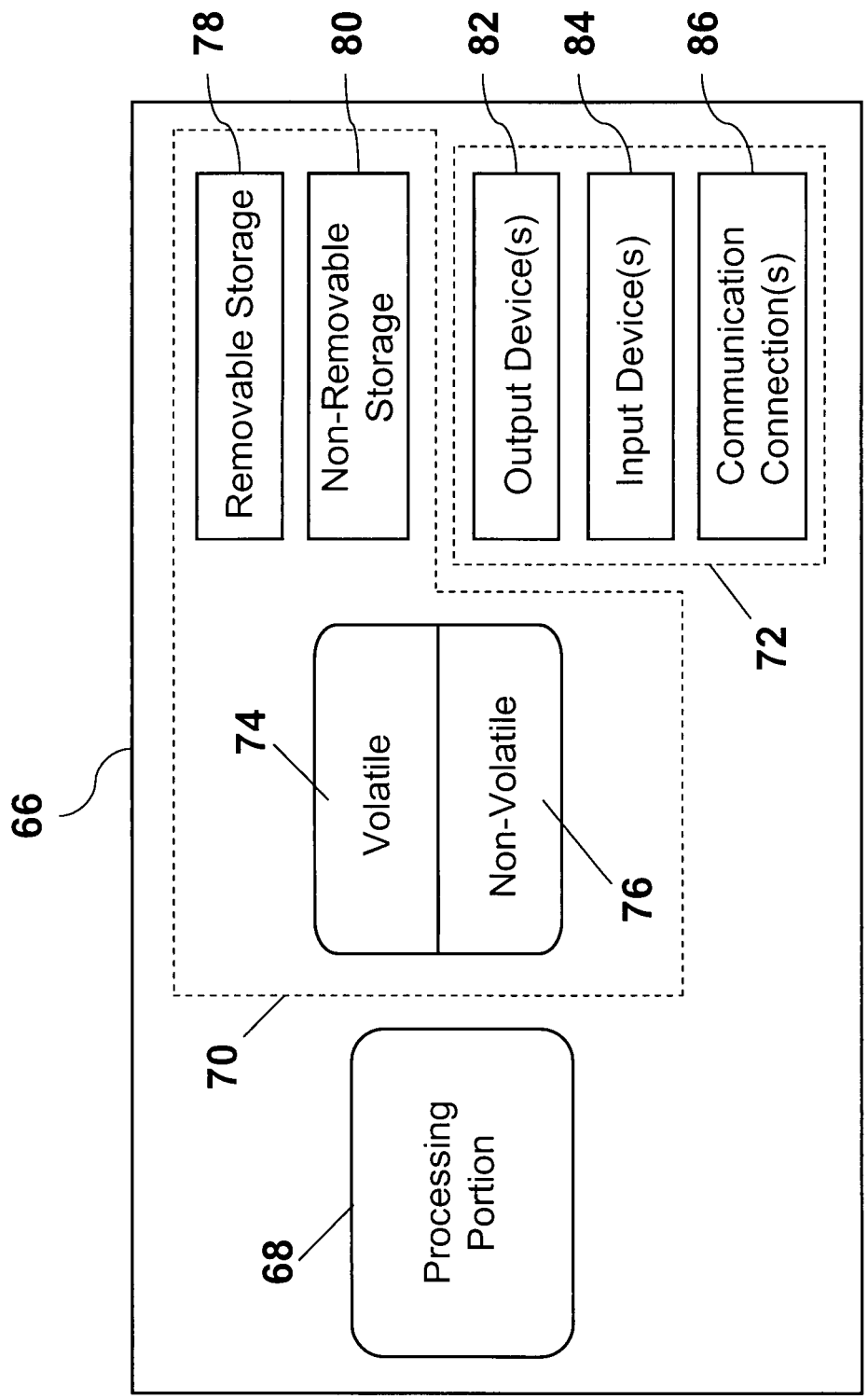
FIG. 5 is a diagram of an exemplary processor for preventing exploitation of update rollback.

As described above, the security gateway can comprise a processor or combination of processors. FIG. 5 is a diagram of an exemplary processor 66 for preventing update rollback. The processor 66 comprises a processing portion 68, a memory portion 70, and an input/output portion 72. The processing portion 68, memory portion 70, and input/output portion 72 are coupled together (coupling not shown in FIG. 5) to allow communications therebetween. The input/output portion 72 is capable of providing and/or receiving components utilized to prevent update rollback as described above. For example, the input/output portion 72 is capable of providing an update status query and receiving a response thereto, as described above.

The processing portion 68 is capable of preventing update rollback as described above. For example, the processing portion 68 is capable of, as described above, generating an update, generating an update version number, generating an update time, generating a question and answer pair, analyzing a query response, determining if information in a query response matches expected information, determining if a received update version is older than an expected update version, taking appropriate action such as sending a warning to the device, stopping the device from operating, disabling selected features of the device, disconnecting the device from the network, banning the device from future connections to the network, installing an update on device, or a combination thereof.

The processor 66 can be implemented as a client processor and/or a server processor. In a basic configuration, the processor 66 can include at least one processing portion 68 and memory portion 70. The memory portion 70 can store any information utilized in conjunction with preventing update rollback. For example the memory portion 70 can store, as describe above, a challenge table or any portion thereof, an update version number, an update time, a device identifier, a question and answer pair, or a combination thereof. Depending upon the exact configuration and type of processor, the memory portion 70 can be volatile (such as RAM) 74, nonvolatile (such as ROM, flash memory, etc.) 76, or a combination thereof. The processor 66 can have additional features/functionality. For example, the processor 66 can include additional storage (removable storage 78 and/or non-removable storage 80) including, but not limited to, magnetic or optical disks, tape, flash, smart cards or a combination thereof. Computer storage media, such as memory portion 70, 74, 76, 78, and 80, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 66. Any such computer storage media can be part of the processor 66.

The processor 66 can also contain communications connection(s) 86 that allow the processor 66 to communicate with other devices, for example. Communications connection(s) 86 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 66 also can have input device(s) 84 such as keyboard, mouse, pen, voice input device, touch input device, etc. Output device(s) 82 such as a display, speakers, printer, etc. also can be included.

Figure 6:
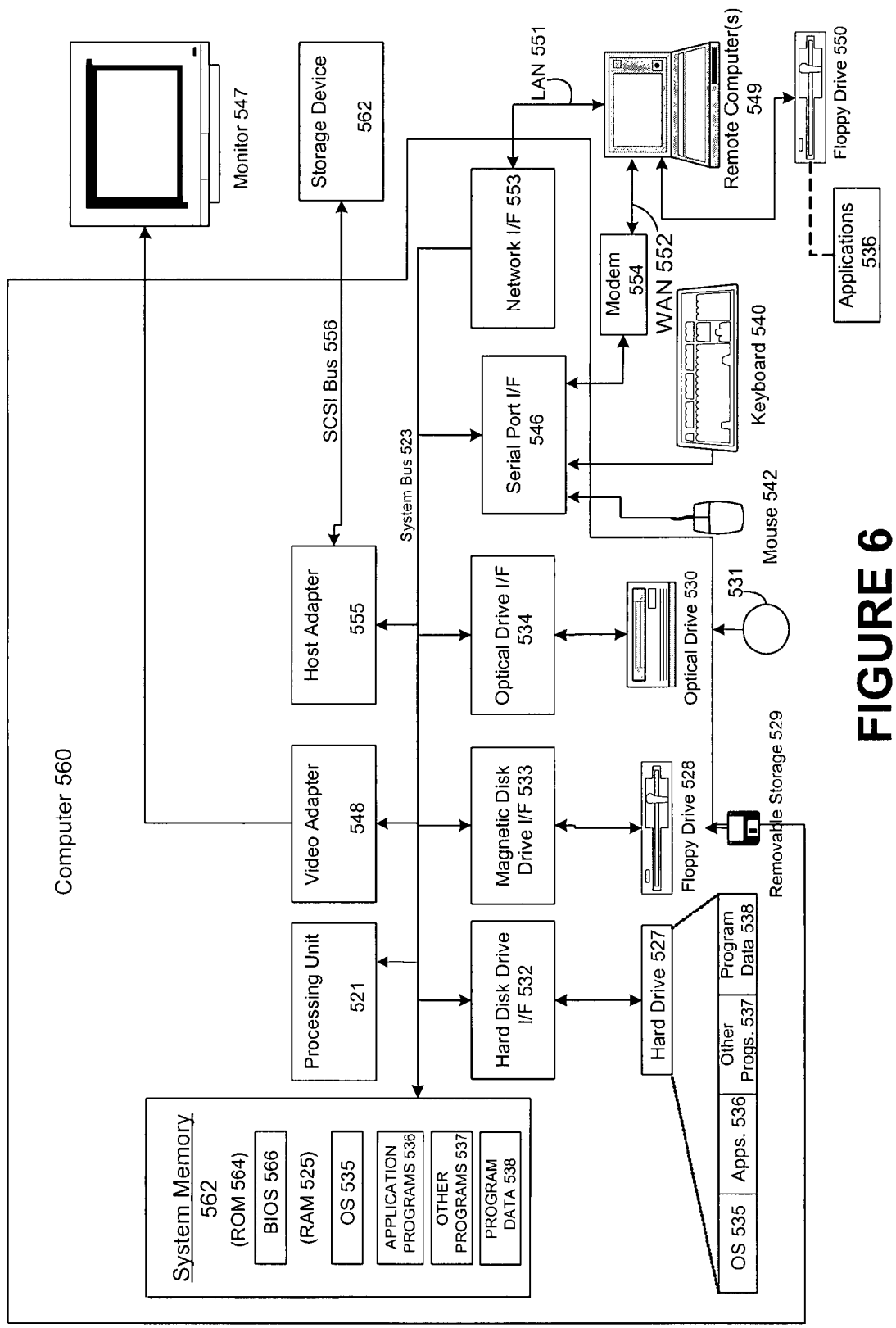
FIG. 6 is a depiction of an example suitable computing environment in which update rollback exploitation prevention can be implemented.

FIG. 6 and the following discussion provide a brief general description of an example suitable computing environment in which the update rollback exploitation prevention can be implemented. Although not required, various aspects of update rollback exploitation prevention can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementation of update rollback exploitation prevention can be practiced with other computer system configurations, including hand held devices, multi processor systems, microprocessor based or programmable consumer electronics, network PCs, mini-computers, mainframe computers, and the like. Further, update rollback exploitation prevention also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 521, the memory (both ROM 564 and RAM 525), the basic input/output system (BIOS) 566, and various input/output (I/O) devices such as a keyboard 540, a mouse 542, a monitor 547, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with update rollback exploitation prevention as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/ software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 6, an exemplary general purpose computing system includes a conventional computing device 560 or the like, including a processing unit 521, a system memory 562, and a system bus 523 that couples various system components including the system memory to the processing unit 521. The system bus 523 may be any of several types of bus structures including a memory bus or memory controller, a peripheral bus, and a local bus using any of a variety of bus architectures. The system memory includes read only memory (ROM) 564 and random access memory (RAM) 525. A basic input/output system 566 (BIOS), containing basic routines that help to transfer information between elements within the computing device 560, such as during start up, is stored in ROM 564. The computing device 560 may further include a hard disk drive 527 for reading from and writing to a hard disk (hard disk not shown), a magnetic disk drive 528 (e.g., floppy drive) for reading from or writing to a removable magnetic disk 529 (e.g., floppy disk, removal storage), and an optical disk drive 530 for reading from or writing to a removable optical disk 531 such as a CD ROM or other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer readable media provide non volatile storage of computer readable instructions, data structures, program modules and other data for the computing device 560. Although the exemplary environment described herein employs a hard disk, a removable magnetic disk 529, and a removable optical disk 531, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarms systems, and other sources of information.

A number of program modules can be stored on the hard disk, magnetic disk 529, optical disk 531, ROM 564, or RAM 525, including an operating system 535, one or more application programs 536, other program modules 537, and program data 538. A user may enter commands and information into the computing device 560 through input devices such as a keyboard 540 and pointing device 542 (e.g., mouse). Other input devices (not shown) may include a microphone, joystick, game pad, satellite disk, scanner, or the like. These and other input devices are often connected to the processing unit 521 through a serial port interface 546 that is coupled to the system bus, but may be connected by other interfaces, such as a parallel port, game port, or universal serial bus (USB). A monitor 547 or other type of display device is also connected to the system bus 523 via an interface, such as a video adapter 548. In addition to the monitor 547, computing devices typically include other peripheral output devices (not shown), such as speakers and printers. The exemplary environment of FIG. 6 also includes a host adapter 555, Small Computer System Interface (SCSI) bus 556, and an external storage device 562 connected to the SCSI bus 556.

The computing device 560 may operate in a networked environment using logical connections to one or more remote computers, such as a remote computer 549. The remote computer 549 may be another computing device (e.g., personal computer), a server, a router, a network PC, a peer device, or other common network node, and typically includes many or all of the elements described above relative to the computing device 560, although only a memory storage device 550 (floppy drive) has been illustrated in FIG. 6. The logical connections depicted in FIG. 6 include a local area network (LAN) 551 and a wide area network (WAN) 552. Such networking environments are commonplace in offices, enterprise wide computer networks, intranets and the Internet.

When used in a LAN networking environment, the computing device 560 is connected to the LAN 551 through a network interface or adapter 553. When used in a WAN networking environment, the computing device 560 can include a modem 554 or other means for establishing communications over the wide area network 552, such as the Internet. The modem 554, which may be internal or external, is connected to the system bus 523 via the serial port interface 546. In a networked environment, program modules depicted relative to the computing device 560, or portions thereof, may be stored in the remote memory storage device. It will be appreciated that the network connections shown are exemplary and other means of establishing a communications link between the computers may be used.

While it is envisioned that numerous embodiments of update rollback exploitation prevention are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for implementing update rollback exploitation prevention, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for preventing update rollback.

The program(s) can be implemented in assembly or machine language, if desired. In any case, the language can be a compiled or interpreted language, and combined with hardware implementations. The methods and apparatuses for implementing update rollback exploitation prevention also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of update rollback exploitation prevention. Additionally storage techniques used in connection with update rollback exploitation prevention can invariably be a combination of hardware and software.

While update rollback exploitation prevention has been described in connection with the example embodiments of the various figures, it is to be understood that other similar embodiments can be used or modifications and additions can be made to the described embodiments for performing the same functions of update rollback exploitation prevention without deviating therefrom. Therefore, update rollback exploitation prevention as described herein should not be limited to any single embodiment, but rather should be construed in breadth and scope in accordance with the appended claims.

What is claimed:

1. A method comprising:
   providing a query for software update status information, an intended recipient of the provided query being a device;
   receiving, by a processor in a security gateway, a response to the query, wherein the response is indicative of a current software update status of a device;
   comparing, via the processor, the received response with an expected response using software update status information stored in the security gateway; and
   if a result of the comparing indicates that the current software update status is older than an expected software update status, concluding that a roll back has occurred in the device.

2. A method in accordance with claim 1, wherein the query for software update status information comprises at least one of:
   a request for an indication of a version of a software update; or
   a request for a time information when a software update was provided to the device.

3. A method in accordance with claim 2, wherein the received response comprises at least one of:
   a version number of a software update; or
   a time of when a software update was provided to the device.

4. A method in accordance with claim 1, further comprising, if it is determined that roll back has occurred in the device, performing at least one of:
   providing a warning to the device;
   disabling at least one feature of the device;
   disabling execution of the device;
   disconnecting the device from a network;
   banning the device from connecting to a network; or
   installing an update on the device.

5. A method in accordance with claim 1, further comprising:
   storing expected information of the device, the expected information comprising at least one of:
   a serial number of the device;
   a history of software updates applied to the device; or
   a history of times associated with software updates to the device.

6. A method in accordance with claim 5, further comprising updating the stored information to include
   an additional time a software update was applied to the device.

7. A security gateway for preventing exploitation of update rollback in a device, the security gateway comprising:
   an input/output portion configured to:
   provide to the device, a query for software update status information;
   receive a response to the query, wherein the response is indicative of a current software update status;
   a memory portion having stored therein, software update status information of the device; and
   a processing portion configured to:
   compare the received response with an expected response using the stored update status information; and
   if a result of the comparison indicates that the current software update status is older than an expected software update status, determine that a roll back has occurred in the device.

8. A system in accordance with claim 7, wherein the query for software update status information comprises at least one of:
   a request for an indication of a version of a software update; or
   a request for a time information when a software update was provided to the device.

9. A system in accordance with claim 8, wherein the received response comprises at least one of:
   a version number of a software update; or
   a time of when a software update was provided to the device.

10. A system in accordance with claim 7, the processing further configured to, if it is determined that update roll back has occurred on a device:
    provide a warning to the device;
    disable at least one feature of the device;
    disable execution of the device;
    disconnect the device from a network;
    ban the device from connecting to a network; or
    install an update on the device.

11. A system in accordance with claim 7, wherein the software update status information stored in the memory portion comprises at least one of:
    a serial number of the device;
    a history of software updates applied to the device; or
    a history of times associated with software updates to the device.

12. A system in accordance with claim 11, the processing portion further configured to update the memory portion to include
    an additional time a software update was applied to the device.

13. A computer-readable storage medium, wherein the storage medium is not a signal, having stored thereon computer-executable instructions for operating a security gateway to prevent exploitation of update rollback in a device, by performing the steps of:
    providing, to the device, a query for software update status information;
    receiving, by a processor in the security gateway, a response to the query, wherein the response is indicative of a current software update status of the device;
    comparing, via the processor, the received response with an expected response using software update status information stored in the security gateway; and
    if a result of the comparing indicates that the current software update status is older than an expected software update status, concluding that a roll back has occurred in the device.

14. A computer-readable storage medium in accordance with claim 13, wherein the query for software update status comprises at least one of:
    a request for an indication of a version of a software update; or a request for a time information when a software update was provided to the device.

15. A computer-readable storage medium in accordance with claim 14, wherein the received response comprises at least one of:
- a version number of a software update; or
- a time of when a software update was provided to the device.

16. A computer-readable storage medium in accordance with claim 13, the computer-executable instructions further for, if it is determined that update roll back has occurred on the device, performing at least one of:
- providing a warning to the device;
- disabling at least one feature of the device;
- disabling execution of the device;
- disconnecting the device from a network;
- banning the device from connecting to a network; or
- installing an update on the device.

17. A computer-readable storage medium in accordance with claim 13, the computer-executable instructions further for:
- storing expected information, wherein, for a device, the expected information comprises at least one of:
  - a serial number of the device;
  - a history of software updates applied to the device; or
  - a history of times associated with software updates to the device.

18. A computer-readable storage medium in accordance with claim 17, the computer-executable instructions further for updating the stored information to include:
- an additional time a software update was applied to the device.

* * * * *